(12) United States Patent
Sugiura (10) Patent No.: US 9,447,824 B2
(45) Date of Patent: Sep. 20, 2016

(54) UNIVERSAL JOINT (71) Applicant: HONDA MOTOR CO., LTD., Tokyo (JP)

(72) Inventor: Yasushi Sugiura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/645,345

(22) Filed: Mar. 11, 2015

(65) Prior Publication Data
US 2015/0260232 A1 Sep. 17, 2015

(30) Foreign Application Priority Data
Mar. 12, 2014 (JP) .................. 2014-048711

(51) Int. Cl.
*F16D 3/06* (2006.01)
*F16D 3/205* (2006.01)

(52) U.S. Cl.
CPC .............. *F16D 3/06* (2013.01); *F16D 3/2055* (2013.01); *Y10S 464/905* (2013.01); *Y10T 464/30* (2015.01)

(58) Field of Classification Search
CPC .... F16D 3/06; F16D 3/2055; Y10S 464/905; Y10T 464/30
USPC ......... 464/29, 111, 123, 124, 162, 169, 905; 180/384
See application file for complete search history.

(56) References Cited

U.S. PATENT DOCUMENTS

| 1,310,021 A | * | 7/1919 | Johnson | .................... F16D 3/72 464/169 X |
| 4,476,950 A | * | 10/1984 | Welschof | ................. B60G 3/24 180/384 |

FOREIGN PATENT DOCUMENTS

JP 11-336783 12/1999

* cited by examiner

*Primary Examiner* — Gregory Binda
(74) *Attorney, Agent, or Firm* — Mori & Ward, LLP (57) ABSTRACT

A universal joint includes a first rotating shaft, a second rotating shaft, an outside joint member, an inside joint member, a roller member, and a shaft length variable mechanism. The outside joint member is coupled to one end portion of the first rotating shaft. The inside joint member is provided in the outside joint member and is coupled to one end portion of the second rotating shaft. The inside joint member transmits running torque from a first rotating shaft side to a second rotating shaft side. The roller member is provided in the inside joint member and is to move on a roller guide surface provided inside the outside joint member. The shaft length variable mechanism is provided in the second rotating shaft and is to change a shaft length of the second rotating shaft in an axial direction of the second rotating shaft.

13 Claims, 8 Drawing Sheets

FIG. 8A (COMPARATIVE EXAMPLE)

UNIVERSAL JOINT

CROSS-REFERENCES TO RELATED APPLICATIONS

The present application claims priority under 35 U.S.C. §119 to Japanese Patent Application No. 2014-048711, filed Mar. 12, 2014, entitled "Universal Joint." The contents of this application are incorporated herein by reference in their entirety.

BACKGROUND

1. Field

The present disclosure relates to a universal joint.

2. Description of the Related Art

For example, Japanese Unexamined Patent Application Publication No. 11-336783 discloses a tripod constant velocity universal joint as a known art that displaces torque transmission members (rollers) along roller guide surfaces upon rotational phase change in an outside joint member and an inside joint member.

SUMMARY

According to one aspect of the present invention, a universal joint includes a first rotating shaft, a second rotating shaft, a cylindrical outside joint member, an inside joint member, a roller member, and a shaft length variable mechanism. The first rotating shaft is coupled to a driving source side. The second rotating shaft is coupled to a wheel side. The cylindrical outside joint member with a bottom is coupled to one end portion of the first rotating shaft in an axial direction of the first rotating shaft. The inside joint member is inserted inside the outside joint member and is fixed to one end portion of the outside joint member in an axial direction of the second rotating shaft. The inside joint member transmits running torque from a first rotating shaft side to a second rotating shaft side. The roller member is provided in the inside joint member and is capable of rolling along a roller guide surface formed inside the outside joint member. The shaft length variable mechanism is provided in the second rotating shaft and changes a shaft length that is a length of the second rotating shaft in an axial direction of the second rotating shaft. The shaft length variable mechanism changes a positional relationship between the roller member and the roller guide surface by changing the shaft length in accordance with the running torque transmitted from the first rotating shaft side.

According to another aspect of the present invention, a universal joint includes a first rotating shaft, a second rotating shaft, a cylindrical outside joint member, an inside joint member, a roller member, and a shaft length variable mechanism. The first rotating shaft is coupled to a driving source side. The second rotating shaft is coupled to a wheel side. The cylindrical outside joint member with a bottom is coupled to one end portion of the first rotating shaft in an axial direction of the first rotating shaft. The inside joint member is inserted inside the outside joint member and is fixed to one end portion of the outside joint member in an axial direction of the second rotating shaft. The inside joint member transmits running torque from a first rotating shaft side to a second rotating shaft side. The roller member is provided in the inside joint member and is capable of rolling along a roller guide surface formed inside the outside joint member. The shaft length variable mechanism is provided in the outside joint member and changes a shaft length that is a length of the outside joint member in an axial direction of the outside joint member. The shaft length variable mechanism changes a positional relationship between the roller member and the roller guide surface by changing the shaft length in accordance with the running torque transmitted from the first rotating shaft side.

According to further aspect of the present invention, a universal joint includes a first rotating shaft, a second rotating shaft, an outside joint member, an inside joint member, a roller member, and a shaft length variable mechanism. The first rotating shaft is coupled to a driving source side. The second rotating shaft is coupled to a wheel side. The outside joint member is coupled to one end portion of the first rotating shaft. The inside joint member is provided in the outside joint member and is coupled to one end portion of the second rotating shaft. The inside joint member transmits running torque from a first rotating shaft side to a second rotating shaft side. The roller member is provided in the inside joint member and is to move on a roller guide surface provided inside the outside joint member. The shaft length variable mechanism is provided in the second rotating shaft and is to change a shaft length of the second rotating shaft in an axial direction of the second rotating shaft.

According to the other aspect of the present invention, a universal joint includes a first rotating shaft, a second rotating shaft, an outside joint member, an inside joint member, a roller member, and a shaft length variable mechanism. The first rotating shaft is coupled to a driving source side. The second rotating shaft is coupled to a wheel side. The outside joint member is coupled to one end portion of the first rotating shaft. The inside joint member is provided in the outside joint member and is coupled to one end portion of the second rotating shaft. The inside joint member transmits running torque from a first rotating shaft side to a second rotating shaft side. The roller member is provided in the inside joint member and is to move on a roller guide surface provided inside the outside joint member. The shaft length variable mechanism is provided in the outside joint member and is to change a shaft length of the outside joint member in an axial direction of the outside joint member.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

Figure 1A:
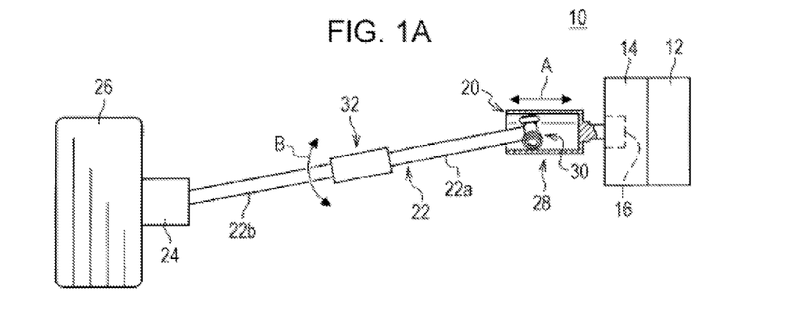
FIG. 1A is a diagram of the overall configuration of a driving power transmission system into which a constant velocity joint according to an exemplary embodiment of the present disclosure is incorporated.
Figure 1B:
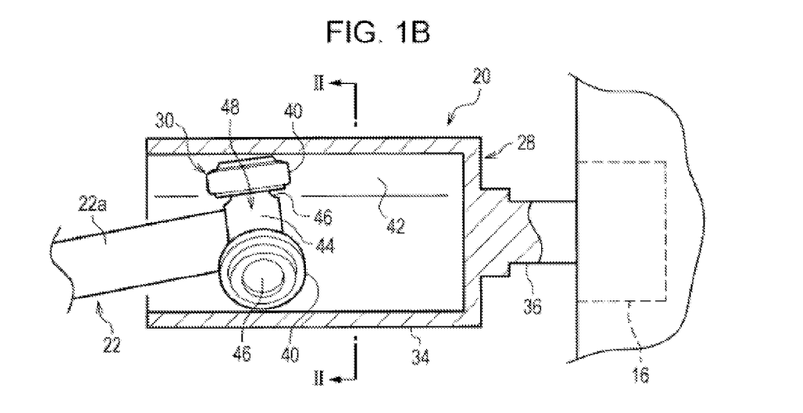
FIG. 1B is a cross-sectional view of a schematic structure of an outside joint member and an inside joint member constituting the constant velocity joint according to the exemplary embodiment of the present disclosure.
Figure 2:
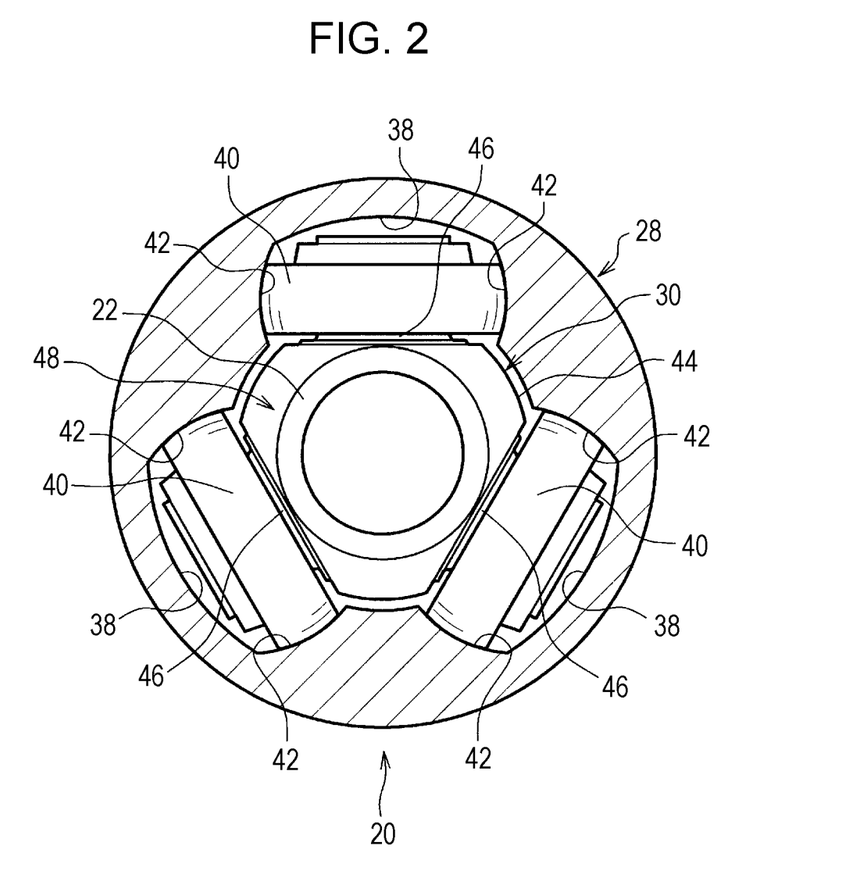
FIG. 2 is a cross-sectional view of the constant velocity joint taken along line II-II of FIG. 1B.

Exemplary embodiments of the present disclosure will be described next in detail while referring to the drawings as required. FIG. 1A is a diagram of the overall configuration of a driving power transmission system into which a constant velocity joint according to an exemplary embodiment of the present disclosure is incorporated, FIG. 1B is a cross-sectional view of a schematic structure of an outside joint member and an inside joint member constituting the constant velocity joint according to the exemplary embodiment of the present disclosure, and FIG. 2 is a cross-sectional view of the constant velocity joint taken along line II-II of FIG. 1B.

As illustrated in FIG. 1A, a driving power transmission system 10 is mounted in a front portion of a front-wheel-drive vehicle (not shown), for example. The driving power transmission system 10 includes an engine (a driving source) 12, a transmission 14 that converts running torque output from the engine 12, and a differential mechanism 16 coupled to an output side of the transmission 14.

A tripod constant velocity joint 20 according to the exemplary embodiment of the present disclosure is coupled to the output side of the differential mechanism 16. The constant velocity joint 20 is coupled to a wheel (front wheel) 26 through a drive shaft 22 and another constant velocity joint 24. The drive shaft 22 functions as "a second rotating shaft coupled to a wheel side". Note that the wheel 26 is supported by a suspension mechanism in a displaceable manner.

The constant velocity joint 20 includes an outside joint member 28 coupled to an output side of the differential mechanism 16, an inside joint member 30 that is provided inside the outside joint member 28, and a shaft length variable mechanism 32 that is provided in an intermediate portion of the drive shaft 22.

As illustrated in FIG. 1B, the outside joint member 28 includes an outer cup (an outer ring member) 34 and a shaft portion 36 that protrudes a predetermined length in an axial direction from the outer cup 34. The outer cup 34 is formed of a cylindrical body with a bottom, the cylindrical body formed such that one end side thereof is closed by an end wall and the other end side thereof is open. The shaft portion 36 is coupled to the differential mechanism 16 and functions as "a first rotating shaft coupled to a driving source side". Note that in the present exemplary embodiment, the outer cup 34 and the shaft portion 36 are formed integrally; however, the outside joint member 28 may be configured such that the end wall and the shaft portion that are formed in an integral manner with respect to each other are bonded to a side peripheral wall, for example.

As illustrated in FIG. 2, three sliding grooves (track grooves) 38 that extend in an axial direction of the outer cup 34 and that are arranged so as to be spaced apart at equal angels in the circumferential direction of the outer cup 34 are formed in an inner surface of the outer cup 34. A pair of roller guide surfaces 42 that are in slide contact with a roller (a roller member) 40 described later are provided in each of the sliding grooves 38 so as to oppose each other. Note that an opening of the outer cup 34 is closed by a bellows-shaped rubber boot (or a bellows-shaped resin boot, not shown).

The inside joint member 30 includes a boss portion 44 that is fitted into and fixed to one end portion of the drive shaft 22, a spider 48 having three trunnion journals 46 that protrude outwards in the radial direction from equally divided positions of the boss portion 44 in the circumferential direction, and rollers 40 that is mounted on the trunnion journals 46 rotatably in the circumferential direction of the trunnion journals 46. Note that a washer, a needle bearing, and the like (all not shown) are interposed between each trunnion journal 46 and the corresponding roller 40. Furthermore, the drive shaft 22 is formed of a hollow tube, for example.

The rollers 40 are provided so as to allow, upon sliding and rolling of the rollers 40 in the sliding grooves 38 of the outer cup 34, the outside joint member 28 and the inside joint member 30 to be relatively displaced in the axial direction (arrow A direction of FIG. 1A) of the outer cup 34. Furthermore, since the outer peripheral surfaces of the rollers 40 are formed to have partially spherical surfaces, even when the drive shaft 22 is pivoted at a certain angle in arrow B direction of FIG. 1A, the rollers 40 are provided so as to allow the rollers 40 to slide and role along the sliding grooves 38 while the spider 48 is in an inclined state.

Figure 3A:
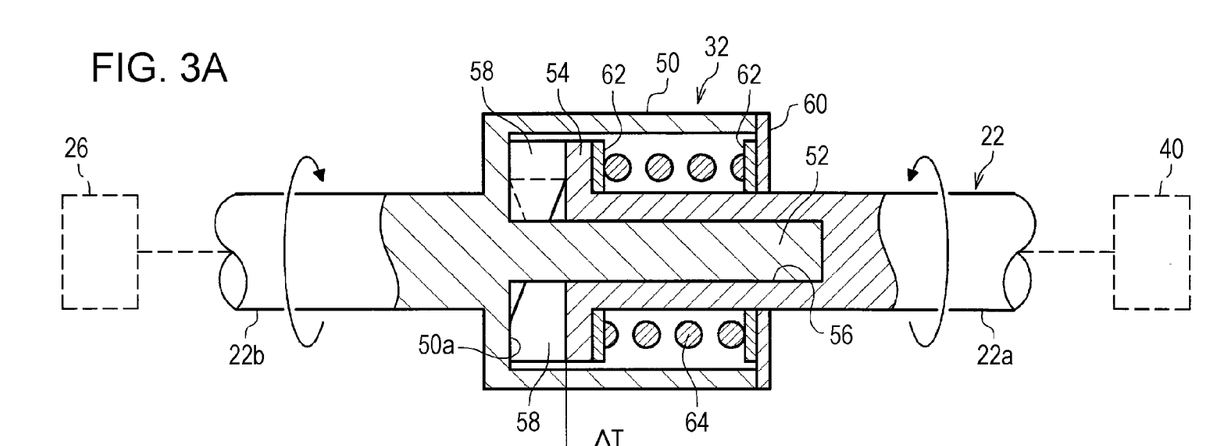
FIG. 3A is a cross-sectional view of a schematic structure of the shaft length variable mechanism and FIG. 3B is a cross-sectional view illustrating a state in which the shaft length of the drive shaft has been increased by ΔT.
Figure 3B:
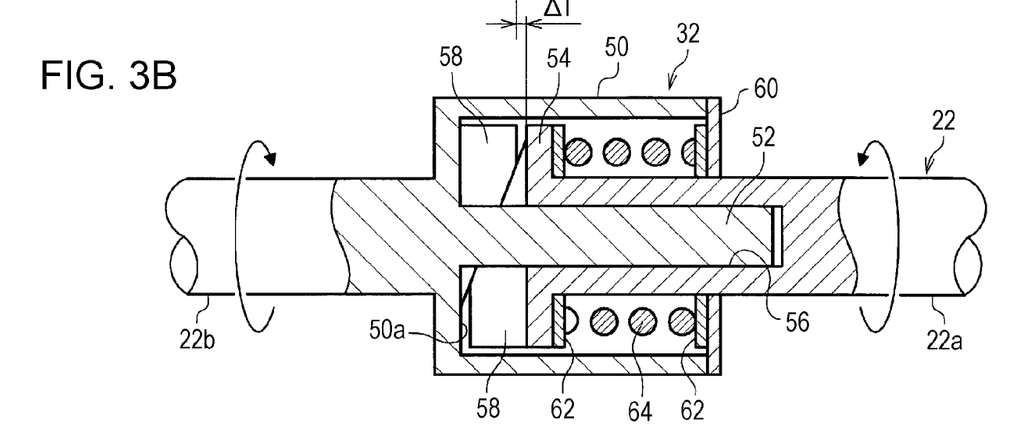

FIG. 3A is a cross-sectional view of a schematic structure of the shaft length variable mechanism and FIG. 3B is a cross-sectional view illustrating a state in which the shaft length of the drive shaft has been increased by ΔT.

The drive shaft 22 includes a first shaft 22a and a second shaft 22b that are formed separately so as to divide the drive shaft 22. The shaft length variable mechanism 32 is provided at a connection portion between the first shaft 22a and the second shaft 22b. Note that the first shaft 22a is coupled on the rollers 40 side of the constant velocity joint 20 and the second shaft 22b is coupled on the wheel 26 side (see FIG. 3A).

As illustrated in FIG. 3A, the shaft length variable mechanism 32 includes a housing 50 that is provided on the second shaft 22b side and that is formed of a cylindrical body with a bottom, and a guide rod 52 that protrudes towards the first shaft 22a from the center of an inner bottom surface 50a of the housing 50.

Furthermore, the shaft length variable mechanism 32 includes a disk portion 54 that is provided at a distal end portion of the first shaft 22a and that has an enlarged diameter extending towards the outside in the radial direction from the center of the distal end, an insertion hole 56 that is formed in the axial direction of the first shaft 22a and into which the guide rod 52 is inserted, and a pair of cam elements 58 that are interposed between the inner bottom surface 50a of the housing 50 and the disk portion 54.

Furthermore, the shaft length variable mechanism 32 includes a closing member 60 that closes an opening of the housing 50, a pair of sliding plates 62 that are disposed so as to oppose each other while being spaced apart at a predetermined distance and that abut against the disk portion 54 and the closing member 60, and a spring member 64 that is interposed between the pair of sliding plates 62. The pair of cam elements 58 that are interposed between the disk portion 54 and the inner bottom surface 50a are pressed by spring force of the spring member 64 so as to be brought into contact with each other (so as to maintain an abutted state of abutting surfaces of the cam elements described later).

Note that by forming the pair of cam elements 58 each with a magnet and by combining the pair of cam elements 58 so that the magnetic forces repel each other, the spring member 64 can be dispensed of. Furthermore, in the present exemplary embodiment, a coil spring is used as the spring member 64; however, a disc spring or a flat spring, for example, may be used.

Figure 4A:
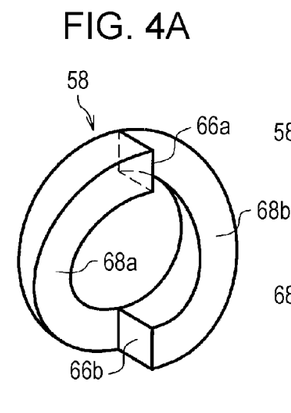
FIG. 4A is a perspective view of a first cam element turned around from the state in FIG. 4B.
Figure 4B:
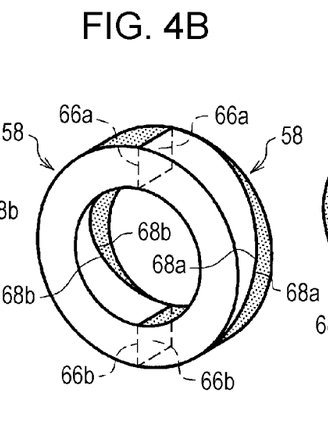
FIG. 4B is a perspective view illustrating a state in which the pair of cam elements are fitted together and are in contact with each other.
Figure 4C:
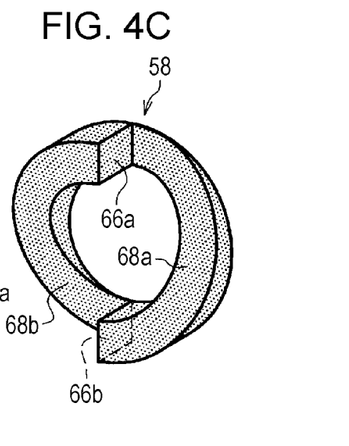
FIG. 4C is a perspective view of a second cam element in the state illustrated in FIG. 4B.
Figure 5A:
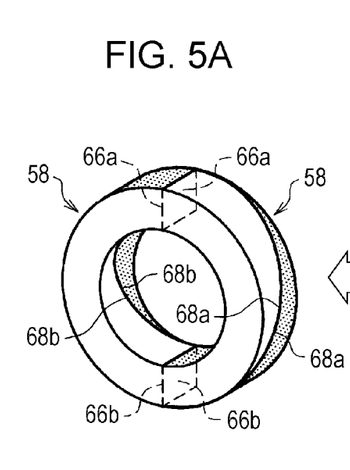
FIG. 5A is a perspective view of the pair of cam elements in which the change in the shaft length is zero.
Figure 5B:
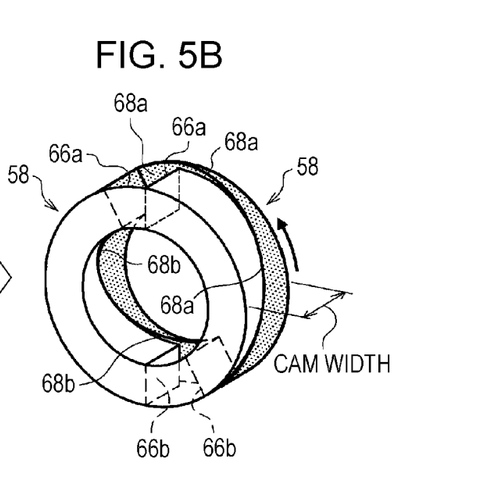
FIG. 5B is a perspective view of the pair of cam elements in which the shaft length has been increased by ΔT after the pair of cam elements have been relatively slid with respect to each other.

FIG. 4B is a perspective view illustrating a state in which the pair of cam elements are fitted together and are in contact with each other, FIG. 4A is a perspective view of a first cam element turned around from the state in FIG. 4B, FIG. 4C is a perspective view of a second cam element in the state illustrated in FIG. 4B, FIG. 5A is a perspective view of the pair of cam elements in which the change in the shaft length is zero, and FIG. 5B is a perspective view of the pair of cam elements in which the shaft length has been increased by ΔT after the pair of cam elements have been relatively slid with respect to each other.

As can be understood by comparing FIGS. 4A and 4C with each other, the pair of cam elements 58 are ring bodies with identical shapes. Each of the cam elements 58 has two abutting surfaces 66a and 66b that are set apart from each other in the circumferential direction at an angle of substantially 180 degrees and that are formed of a rectangular shape, and two slidable cam surfaces 68a and 68b that are bent in a substantially semicircular arc shape. Each of the cam elements 58 are configured so that the plate thickness of the cam body gradually decreases from a first abutting surface 66a (66b) towards a second abutting surface 66b (66a). With the decrease in the plate thickness of the cam body, the cam surfaces 68a and 68b are formed with inclined surfaces that are inclined from the first abutting surface 66a (66b) towards the second abutting surface 66b (66a).

As illustrated in FIG. 4B, the pair of cam elements 58 are fitted together so that the first abutting surfaces 66a and 66a are abutted against each other and the second abutting surfaces 66b and 66b are abutted against each other, and so that the first cam surfaces 68a and 68a are brought in contact with each other and the second cam surfaces 68b and 68b are brought in contact with each other.

As illustrated in the comparison between FIGS. 5A and 5B, by relatively displacing (sliding) the first cam element 58 with respect to the second cam element 58 along the cam surfaces 68a and 68b, the cam width that is orthogonal to the cam thickness is increased. The amount of change in the cam width is the same as the amount of change ΔT in the shaft length of the drive shaft 22.

The pair of cam elements 58 that are interposed between the inner bottom surface 50a of the housing 50 and the disk portion 54 are in a pressed state by the spring force of the spring member 64, and the amount of change ΔT in the shaft length during normal travel of the vehicle is zero (the amount of change in the cam width is zero). In the above case, in the pair of cam elements 58, the first abutting surfaces 66a and 66a are in an abutted state and are not spaced apart from each other, and the second abutting surfaces 66b and 66b are in an abutted state and are not spaced apart from each other (see FIG. 5A).

Conversely, when a large running torque that is larger than a set torque is input to the shaft length variable mechanism 32, the pair of cam elements 58 countering the spring force of the spring member 64 are relatively displaced and the cam surfaces 68a and 68b slide against each other such that the cam width is increased. With the above, the shaft length of the drive shaft 22 is increased by ΔT (see FIG. 3B). Upon sliding between the cam surfaces 68a and between the cam surfaces 68b of the pair of cam elements 58, the first and the second abutting surfaces 66a, 66a, 66b and 66b are set apart from each other (see FIG. 5B).

Modifications of the cam elements 58 will be illustrated next in FIGS. 6A to 7C.

Figure 6A:
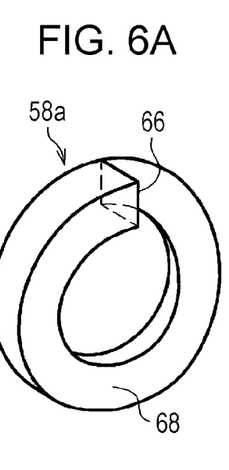
FIG. 6A is a perspective view of a first cam element according to the modification turned around from the state in FIG. 6B.
Figure 6B:
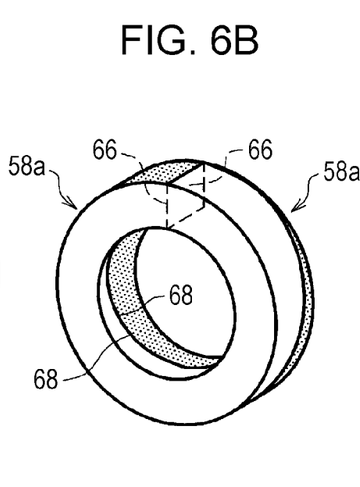
FIG. 6B is a perspective view illustrating a state in which a pair of cam elements according to a modification are fitted together and are in contact with each other.
Figure 6C:
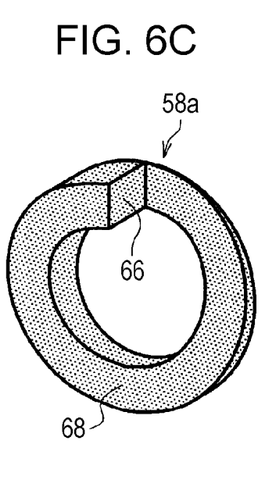
FIG. 6C is a perspective view of a second cam element according to the modification in the state illustrated in FIG. 6B.
Figure 7A:
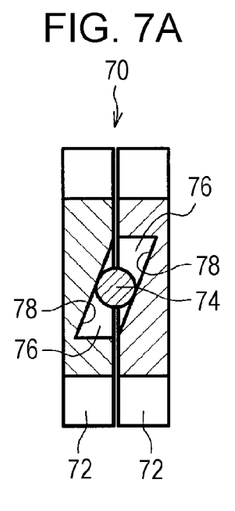
FIG. 7A is a cross-sectional view of a ball cam according to a modification.
Figure 7B:
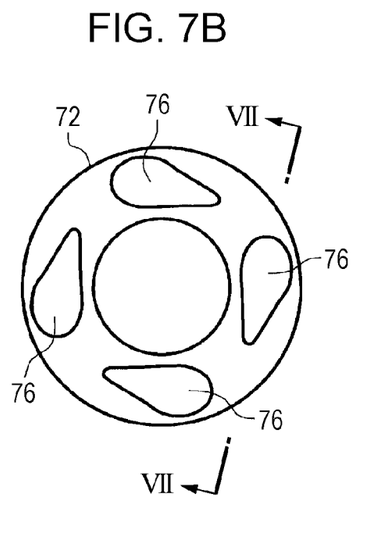
FIG. 7B is a plan view of a cam plate.

FIG. 6B is a perspective view illustrating a state in which a pair of cam elements according to a modification are fitted together and are in contact with each other, FIG. 6A is a perspective view of a first cam element according to the modification turned around from the state in FIG. 6B, FIG. 6C is a perspective view of a second cam element according to the modification in the state illustrated in FIG. 6B, FIG. 7A is a cross-sectional view of a ball cam according to a modification, FIG. 7B is a plan view of a cam plate, and FIG. 70 is a cross-sectional view taken along line VII-VII of FIG. 7B.

Compared with the pair of cam elements 58 illustrated in FIGS. 4A to 4C, a pair of cam elements 58a according to the modification are different in that a single abutting surface 66 and a single cam surface 68 are provided in each of the cam elements 58a. The pair of cam elements 58a according to the modification can be fabricated easily.

Figure 7C:
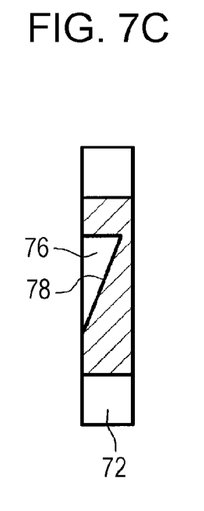
FIG. 7C is a cross-sectional view taken along line VII-VII of FIG. 7B.

As illustrated in FIG. 7A, a ball cam 70 according to the modification includes a pair of ring-shaped cam plates 72 and a plurality of balls 74 interposed between the pair of cam plates 72. As illustrated in FIG. 7B, on a surface of each cam plate 72 (contact surfaces of the cam plates 72), four ball rolling grooves 76 each having a compound shape that is a combination of a semicircle and a substantially triangular shape are formed in the circumferential direction in plan view. As illustrated in FIG. 7C, the ball rolling grooves 76 each have a substantially rectangular cross section, and an inclined surface 78 inclined so that the depth of the groove gradually increases from one side to the other side is formed in a groove bottom. Accordingly, the depth of the groove between the inclined surface 78 and the surface of the cam plate 72 becomes shallower while approaching the tip of the triangular shape of the ball rolling groove 76 and, on the other hand, while approaching the semicircular shaped portion, the depth of the groove between the inclined surface 78 and the surface of the cam plate 72 becomes deeper.

As illustrated in FIG. 7A, the surfaces of the pair of cam plates 72 are combined so as to be in contact with each other in such a manner that the front-rear directions of the ball rolling grooves 76 on one side are opposite the front-rear directions of the ball rolling grooves 76 on the other side. By combining the ball rolling grooves 76 in the above manner, the cross section of the ball rolling grooves 76 put together forms a substantially parallelogram shape. The balls 74 are disposed in the middle portion of the ball rolling grooves 76 put together. Relative displacement of the pair of cam plates 72 rolls the balls 74 inside the ball rolling grooves 76 such that the balls 74 are shifted from the middle of the substantially parallelogram-shaped ball rolling grooves 76; accordingly, the pair of cam plates 72 are displaced so as to be spaced apart from each other to increase the shaft length.

The driving power transmission system 10 into which the constant velocity joint 20 of the present exemplary embodiment is incorporated is basically configured in the above manner, and the effects thereof will be described next.

A torque transmission path through which the running torque generated by the rotational drive of the engine 12 is transmitted to the wheel 26 will be described first.

The running torque on the engine 12 side is input to the outer cup 34 through the shaft portion 36 of the constant velocity joint 20. The running torque that has been input to the outer cup 34 is transmitted to the drive shaft 22 through the rollers 40 that are in contact with the roller guide surfaces 42 formed on the inner surface of the outer cup 34 and through the spider 48. The running torque transmitted to the drive shaft 22 is transmitted to the wheel 26 through the other constant velocity joint 24 disposed on an outboard side.

Figure 8A:
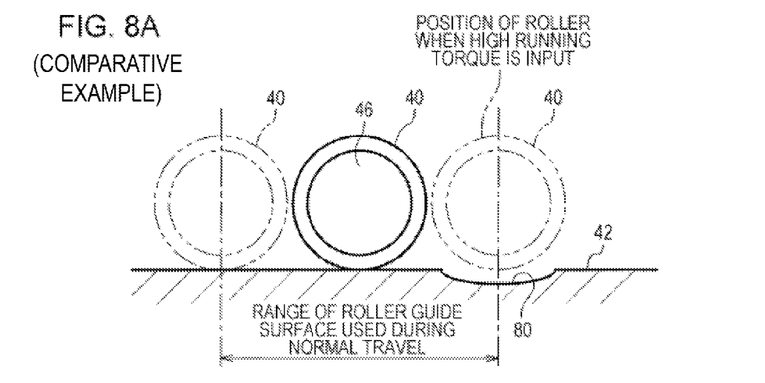
FIG. 8A is a schematic diagram illustrating a positional relationship between a roller and a roller guide surface when excessive torque is input to a constant velocity joint according to a comparative example.
Figure 8B:
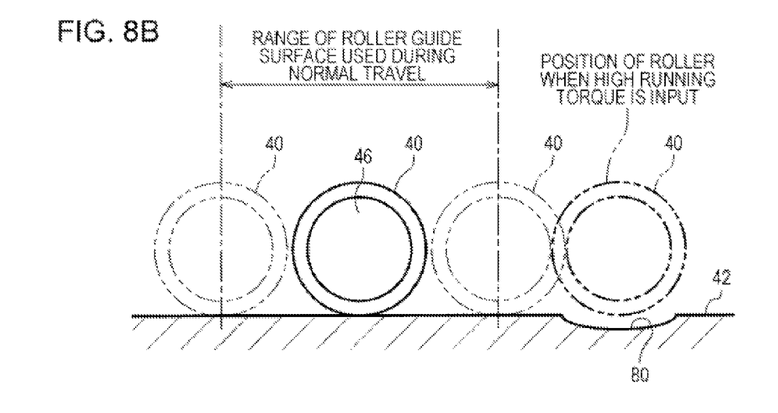
FIG. 8B is a schematic diagram illustrating a positional relationship between the roller and the roller guide surface when excessive torque is input to the constant velocity joint according to the present exemplary embodiment.

A case in which excessive running torque exceeding the set torque is input to the constant velocity joint 20 will be described next. FIG. 8A is a schematic diagram illustrating a positional relationship between a roller and a roller guide surface when excessive torque is input to a constant velocity joint according to a comparative example, and FIG. 8B is a schematic diagram illustrating a positional relationship between the roller and the roller guide surface when excessive torque is input to the constant velocity joint according to the present exemplary embodiment.

The constant velocity joint according to the comparative example is different from the constant velocity joint 20 according to the present exemplary embodiment in that the shaft length variable mechanism 32 is not provided, and other than that, the configuration is to be the same as that of the constant velocity joint 20 according to the present exemplary embodiment. Note that FIGS. 8A and 8B illustrates, in a planar manner, a state in which the roller 40 rolls along the pair of roller guide surfaces 42 opposing each other inside the sliding groove 38 and illustrates only the roller guide surface 42 on one side that is in contact with the roller 40 while omitting illustration of the roller guide surface 42 on the other side.

In the comparative example, when a high running torque is input at the time of acceleration of the vehicle, for example, the contact force of the roller 40 applied to the roller guide surface 42 is high compared with that during normal travel and, accordingly, compared with other portions of the roller guide surface 42, wear at the above portion of contact with the roller 40 is significant. As a result, a curved recess 80 is formed in the roller guide surface 42, for example. As illustrated in FIG. 8A, in the comparative example, the position of the roller 40 when a high running torque is input is within the range of the roller guide surface 42 used during normal travel.

Conversely, in the present exemplary embodiment, when a large running torque compared to the running torque during normal travel is input to the constant velocity joint 20 and when the contact force between the roller guide surface 42 and the roller 40 becomes larger than the contact force during normal travel, the shaft length of the drive shaft 22 can be increased by $\Delta T$ with the shaft length variable mechanism 32 in accordance with a value of the input running torque. As illustrated in FIG. 8B, in the present exemplary embodiment, with the increase in the shaft length of the drive shaft 22 by $\Delta T$, the roller 40 comes into contact with the roller guide surface 42 at a position in the roller guide surface 42 that is shifted (offset) by $\Delta T$ amounting to the increased shaft length of the drive shaft 22 from the position (the used range) that is in contact during normal travel. As a result, in the present exemplary embodiment, the curved recess 80 formed in the roller guide surface 42 is positioned at a position outside the normally used range that is a range that exceeds the range used by the roller guide surface 42 during normal travel.

In the exemplary embodiment, when a large running torque compared to that during normal travel is input, the roller 40 can be brought into contact with the roller guide surface 42 at a position that exceeds the normally used range of the roller guide surface 42 that is in contact with the roller 40 during normal travel by increasing the length of the drive shaft 22 by $\Delta T$ through the shaft length variable mechanism 32.

As describe above, in the present exemplary embodiment, by increasing the shaft length of the drive shaft 22 by $\Delta T$, the position where the recess 80 is formed becomes a position outside the normally used range; accordingly, transmission of the running torque during normal travel is performed in the normally used range of the roller guide surface 42 and, during normal travel, the transmission of the running torque at the position exceeding the normally used range (the position out of the normally used range) can be avoided. In other words, in transmitting the running torque during normal travel, the roller 40 does not come into contact with the recess 80 that is positioned outside the normally used range. Accordingly, in the present exemplary embodiment, occurrence of abnormal noise and vibration can be suppressed and decrease in ride comfort of the occupant can be suitably avoided.

Note that in the exemplary embodiment, the shaft length variable mechanism 32 can be arranged at any intermediate position in the drive shaft 22; however, from the view point of suppressing the unsprung weight (reducing the unsprung mass), the shaft length variable mechanism 32 is desirably disposed on one side of the drive shaft 22 that is close to the constant velocity joint 20 (the inside joint member 30).

Furthermore, an exemplification is given in which the present embodiment is applied to the constant velocity joint 20 on an inboard side that is disposed on the differential mechanism 16 side; however, the present embodiment may be applied to the other constant velocity joint 24 (tripod type constant velocity joint) on the outboard side that is close to the wheel 26.

Figure 9:
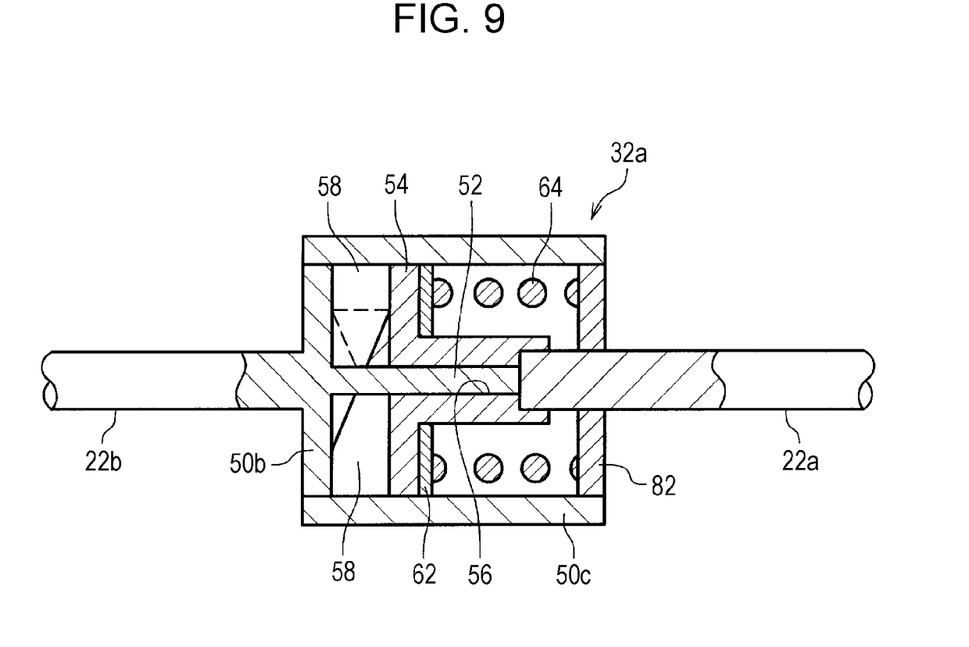
FIG. 9 is a cross-sectional view illustrating a modification of the shaft length variable mechanism illustrated in FIG. 3A.

FIG. 9 is a cross-sectional view illustrating a modification of the shaft length variable mechanism illustrated in FIG. 3A.

An outline of a configuration of a shaft length variable mechanism 32a according to the modification will be described. Note that the description will be given while components that are the same as the components of the shaft length variable mechanism 32 illustrated in FIG. 3A are attached with the same reference numerals.

The housing includes a bottom wall 50b that is integrally formed with the second shaft 22b, a side peripheral wall 50c that is bonded to the bottom wall 50b, and a lid member 82 that closes an opening of the side peripheral wall 50c. A cam element 58 on one side among the pair of cam elements 58 is integrally formed with the bottom wall 50b. A cam element 58 on the other side is integrally formed with the disk portion 54.

In the shaft length variable mechanism 32a according to the modification, by configuring each of the members separately and by assembling the members together, an advantage in that the fabrication process can be simplified and fabrication thereof can be facilitated can be obtained.

Hereinafter, a constant velocity joint 20a according to another exemplary embodiment of the present disclosure will be described next in detail. Note that components that are the same as those of the constant velocity joint 20 according to the exemplary embodiment described above will be attached with the same reference numerals and detailed description thereof is omitted.

Figure 10A:
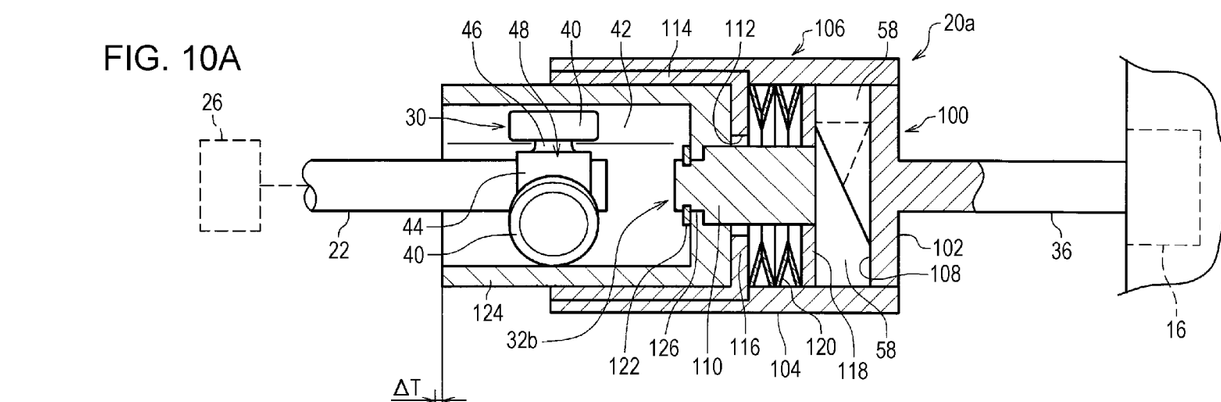
FIG. 10A is a cross-sectional view of a constant velocity joint according to the other exemplary embodiment of the present disclosure and FIG. 10B is a cross-sectional view illustrating a state in which the shaft length of the outer cup has been increased by ΔT.
Figure 10B:
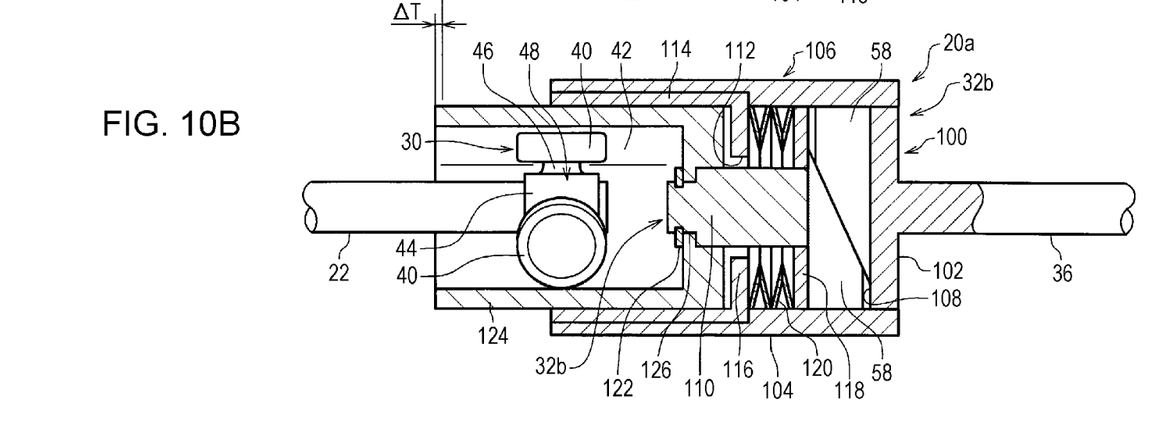

FIG. 10A is a cross-sectional view of a constant velocity joint according to the other exemplary embodiment of the present disclosure and FIG. 10B is a cross-sectional view illustrating a state in which the shaft length of the outer cup has been increased by ΔT.

While in the exemplary embodiment described above, the shaft length variable mechanism 32 is disposed in the intermediate portion between the first shaft 22a and the second shaft 22b that divide the drive shaft 22 and the shaft length of the drive shaft 22 is configured so as to extend by ΔT, the other exemplary embodiment is different in that a shaft length variable mechanism 32b is disposed inside the outer cup 34 of the outside joint member 28 and a shaft length that is the length of the outer cup 34 in the axial direction is increased by ΔT.

As illustrated in FIG. 10A, in the constant velocity joint 20a according to the other exemplary embodiment, an outside joint member 100 includes an outer cup 106 having a bottom wall 102 formed integrally with the shaft portion 36 and a side peripheral wall 104 that is bonded to the bottom wall 102. The shaft length variable mechanism 32b is provided inside the outer cup 106.

The shaft length variable mechanism 32b includes a cam element 58 on one side disposed on an inner bottom surface 108 side of the bottom wall 102, a cam element 58 on the other side that is disposed on the opposite side, a connection rod 110 that is coupled to the cam element 58 on the other side and that is provided so as to be capable of being displaced in the axial direction together with the cam element 58 on the other side in an integrated manner, and a securing member 114 that is secured to the outer cup 106 formed with a through hole 112 through which the connection rod 110 penetrates.

The shaft length variable mechanism 32b further includes a spring member 120 that has a bellows-shaped cross section and that is interposed between an annular flange portion 116 of the securing member 114 and a slide member 118, and a slider 124 that is fixed to a distal end of the connection rod 110 through a C-ring 122 and that is provided so as to be slidable against the securing member 114. Note that the inside joint member 30 that is accommodated inside the outer cup 106 is the same as the inside joint member 30 of the exemplary embodiment described above. Furthermore, the spring member 120 may be a coil spring, a disc spring, or a flat spring, for example.

The cam element 58 on one side that is disposed on the inner bottom surface 108 side of the bottom wall 102 is desirably formed integrally with the bottom wall 102. Furthermore, in the connection portion between the connection rod 110 and the slider 124, a serration portion 126 in which serration teeth and serration grooves (both not shown) are serration-fitted to each other is provided. By providing the serration portion 126, the running torque from the shaft portion 36 side can be transmitted to the slider 124 through the connection rod 110 in a smooth manner. Furthermore, the securing member 114 pushes the spring member 120 towards the pair of cam elements 58 side and functions as a guide along which the slider 124 slides in the axial direction of the outer cup 106.

In the shaft length variable mechanism 32b, when a high running torque is input, the cam element 58 on the other side and the connection rod 110 countering the spring force of the spring member 120 are displaced in an integrated manner in the axial direction of the outer cup 106, and the displacement is transmitted to the slider 124. The slider 124 slides along the inner peripheral surface of the securing member 114 secured to the outer cup 106 and the shaft length of the outer cup 106 is increased by ΔT (see FIG. 10B).

In the present exemplary embodiment, the shaft length of the outer cup 106 is increased by ΔT by the displacement of the slider 124; accordingly, transmission of the running torque during normal travel is performed in the normally used range of the roller guide surface 42 and, during normal travel, the transmission of the running torque at the position exceeding the normally used range (the position shifted from the normally used range of the roller guide surface 42 that the roller 40 normally uses) can be avoided. Accordingly, in the present exemplary embodiment, occurrence of abnormal noise and vibration can be suppressed and decrease in ride comfort of the occupant can be suitably avoided.

Furthermore, since in the present exemplary embodiment, no extra processing for the drive shaft 22 itself is needed, the drive shaft 22 can acquire a designated degree of rigidity and strength. Note that other effects of the present embodiment are the same as the exemplary embodiment described above and, accordingly, detailed description of the effects is omitted.

A first aspect of the present disclosure describes a first rotating shaft coupled to a driving source side; a second rotating shaft coupled to a wheel side; a cylindrical outside joint member with a bottom, the cylindrical outside joint member coupled to one end portion of the first rotating shaft in an axial direction of the first rotating shaft; an inside joint member that is inserted inside and fixed to one end portion of the outside joint member in an axial direction of the second rotating shaft, the inside joint member transmitting running torque from a first rotating shaft side to a second rotating shaft side; a roller member that is provided in the inside joint member and that is capable of rolling along a roller guide surface formed inside the outside joint member; and a shaft length variable mechanism that is provided in the second rotating shaft, the shaft length variable mechanism changing a shaft length that is a length of the second rotating shaft in an axial direction of the second rotating shaft, wherein the shaft length variable mechanism changes a positional relationship between the roller member and the roller guide surface by changing the shaft length in accordance with the running torque transmitted from the first rotating shaft side.

According to such an aspect of the present disclosure, for example, during acceleration, when running torque that is large compared to the running torque during normal travel of the vehicle is input to the universal joint and when the contact force between the roller guide surface and the roller becomes larger than the contact force during normal travel, the shaft length variable mechanism is capable of changing the shaft length of the second rotating shaft in accordance with a value of the input running torque. With the change in the shaft length of the second rotating shaft, the roller comes into contact with the roller guide surface at a position shifted by a length equivalent to the change in the shaft length of the second rotating shaft from where the roller is in contact with the roller guide surface during normal travel.

In other words, when a running torque that is large compared to the running torque during normal travel is input, the roller can be brought into contact with the roller guide surface at a position that exceeds the normally used range of the roller guide surface that is in contact with the roller during normal travel by increasing the shaft length of the second rotating shaft through the shaft length variable mechanism.

According to such an aspect of the present disclosure, the shaft length of the second rotating shaft is changed; accordingly, transmission of the running torque during normal travel is performed in the normally used range of the roller guide surface and, during normal travel, the transmission of the running torque at the position exceeding the normally used range (the position shifted from the normally used range of the roller guide surface that the roller normally uses) can be avoided. Accordingly, in the above aspect of the present disclosure, occurrence of abnormal noise and vibration can be suppressed and decrease in ride comfort of the occupant can be suitably avoided.

Furthermore, another aspect of the present disclosure includes a first rotating shaft coupled to a driving source side a second rotating shaft coupled to a wheel side; a cylindrical outside joint member with a bottom, the cylindrical outside joint member coupled to one end portion of the first rotating shaft in an axial direction of the first rotating shaft; an inside joint member that is inserted inside and fixed to one end portion of the outside joint member in an axial direction of the second rotating shaft, the inside joint member transmitting running torque from a first rotating shaft side to a second rotating shaft side; a roller member that is provided in the inside joint member and that is capable of rolling along a roller guide surface formed inside the outside joint member; and a shaft length variable mechanism that is provided in the outside joint member, the shaft length variable mechanism changing a shaft length that is a length of the outside joint member in an axial direction of the outside joint member, in which the shaft length variable mechanism changes a positional relationship between the roller member and the roller guide surface by changing the shaft length in accordance with the running torque transmitted from the first rotating shaft side.

According to such an aspect of the present disclosure, for example, during, acceleration, when a running torque that is large compared to the running torque during normal travel of the vehicle is input to the universal joint and when the contact force between the roller guide surface and the roller becomes larger than the contact force during normal travel, the shaft length variable mechanism is capable of changing the shaft length of the outside joint member in accordance with a value of the input running torque. With the change in the shaft length of the second rotating shaft, the roller comes into contact with the roller guide surface at a position shifted by a length equivalent to the change in the shaft length of the outside joint member from where the roller is in contact with the roller guide surface during normal travel.

In other words, when a running torque that is large compared to the running torque during normal travel is input, the roller can be brought into contact with the roller guide surface at a position that exceeds the normally used range of the roller guide surface that is in contact with the roller during normal travel by increasing the shaft length of the outside joint member through the shaft length variable mechanism.

According to such an aspect of the present disclosure, the shaft length of the outside joint member is changed; accordingly, transmission of the running torque during normal travel is performed in the normally used range of the roller guide surface and, during normal travel, the transmission of the running torque at the position exceeding the normally used range (the position shifted from the normally used range of the roller guide surface that the roller normally uses) can be avoided. Accordingly, in the above aspect of the present disclosure, occurrence of abnormal noise and vibration can be suppressed and decrease in ride comfort of the occupant can be suitably avoided.

Obviously, numerous modifications and variations of the present invention are possible in light of the above teachings. It is therefore to be understood that within the scope of the appended claims, the invention may be practiced otherwise than as specifically described herein.

What is claimed is:

1. A universal joint comprising:
    a first rotating shaft coupled to a driving source side;
    a second rotating shaft coupled to a wheel side;
    an outside joint member coupled to one end portion of the first rotating shaft;
    an inside joint member provided in the outside joint member and coupled to one end portion of the second rotating shaft and transmitting running torque from a first rotating shaft side to a second rotating shaft side;
    a roller member provided in the inside joint member and being configured to move on a roller guide surface provided inside the outside joint member; and
    a shaft length variable mechanism provided in the second rotating shaft and being configured to change a shaft length of the second rotating shaft in an axial direction of the second rotating shaft,
    wherein the shaft length variable mechanism comprises a cam comprising:
        a first cam element having a first inclined surface; and
        a second cam element having a second inclined surface, the second cam element being configured to rotate about the axial direction with respect to the first cam element so that first inclined surface and the second inclined surface act against each other to change a width of the cam in the axial direction in order to change the shaft length of the second rotating shaft.

2. The universal joint according to claim 1, wherein the shaft length variable mechanism changes a positional relationship between the roller member and the roller guide surface by changing the shaft length in accordance with the running torque transmitted from the first rotating shaft side.

3. The universal joint according to claim 2, wherein the cam changes the width of the cam in accordance with the running torque transmitted from the first rotating shaft side.

4. The universal joint according to claim 3, wherein the cam comprises:
    a first cam element having a first ball rolling groove;

a second cam element having a second ball rolling groove; and a ball rolling inside the first ball rolling groove and the second ball rolling groove for the first cam element to be apart from the second cam element.

5. The universal joint according to claim 1,
wherein each of the first cam element and the second cam element is a magnet, and
wherein the first cam element is combined with the second cam element to repel each other.

6. The universal joint according to claim 1, wherein an outer peripheral surface of the roller member has a partially spherical surface.

7. The universal joint according to claim 1, wherein the shaft length variable mechanism is disposed on one side of the second rotating shaft, the one side is closer to the inside joint member than a wheel of the wheel side.

8. The universal joint according to claim 1,
wherein the inside joint member includes a boss portion, and
the roller member is mounted on the boss portion by a trunnion journal.

9. The universal joint according to claim 1,
wherein the inside joint member includes a boss portion having the roller member and at least one additional roller member each being rotatably mounted on the boss portion,
wherein the outside joint member includes a plurality of roller guide surfaces each extending in a direction parallel to an axial direction of the first rotating shaft, and
wherein the roller member and the at least one additional roller member each being in slide contact with a respective roller guide surface of the plurality of roller guide surfaces.

10. A universal joint, comprising:
a first rotating shaft coupled to a driving source side;
a second rotating shaft coupled to a wheel side;
a cylindrical outside joint member with a bottom, the cylindrical outside joint member coupled to one end portion of the first rotating shaft in an axial direction of the first rotating shaft;
an inside joint member that is inserted inside and fixed to one end portion of the outside joint member in an axial direction of the second rotating shaft, the inside joint member transmitting running torque from a first rotating shaft side to a second rotating shaft side;
a roller member that is provided in the inside joint member and that is capable of rolling along a roller guide surface formed inside the outside joint member; and
a shaft length variable mechanism that is provided in the second rotating shaft, the shaft length variable mechanism changing a shaft length that is a length of the second rotating shaft in an axial direction of the second rotating shaft, wherein
the shaft length variable mechanism changes a positional relationship between the roller member and the roller guide surface by changing the shaft length in accordance with the running torque transmitted from the first rotating shaft side.

11. The universal joint according to claim 10, wherein the shaft length variable mechanism comprises a cam comprising:
a first cam element having a first inclined surface; and
a second cam element having a second inclined surface, the second cam element being configured to rotate about the axial direction with respect to the first cam element so that first inclined surface and the second inclined surface act against each other to change a width of the cam in the axial direction in order to change the positional relationship.

12. The universal joint according to claim 10,
wherein the inside joint member includes a boss portion, and
the roller member is mounted on the boss portion by a trunnion journal.

13. The universal joint according to claim 10,
wherein the inside joint member includes a boss portion having the roller member and at least one additional roller member each being rotatably mounted on the boss portion,
wherein the outside joint member includes a plurality of roller guide surfaces each extending in a direction parallel to an axial direction of the first rotating shaft, and
wherein the roller member and the at least one additional roller member each being in slide contact with a respective roller guide surface of the plurality of roller guide surfaces.

* * * * *